United States Patent
Bhaumik et al.

(10) Patent No.: US 9,401,175 B1
(45) Date of Patent: Jul. 26, 2016

(54) PREAMPLIFIER CROSSTALK CORRECTION IN ARRAY READER MAGNETIC RECORDING SYSTEM

(71) Applicant: Avago Technologies General IP (Singapore) Pte. Ltd., Singapore (SG)

(72) Inventors: Jaydip Bhaumik, Longmont, CO (US); Jeffrey A. Gleason, Mendota Heights, MN (US); Scott M. O'Brien, Mendota Heights, MN (US); Travis Oenning, San Jose, CA (US); Ross S. Wilson, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/805,435

(22) Filed: Jul. 21, 2015

(51) Int. Cl.
| | |
|---|---|
| *G11B 5/02* | (2006.01) |
| *G11B 5/09* | (2006.01) |
| *G11B 5/596* | (2006.01) |
| *G11B 20/10* | (2006.01) |

(52) U.S. Cl.
CPC ............ *G11B 20/10388* (2013.01); *G11B 5/09* (2013.01); *G11B 5/596* (2013.01)

(58) Field of Classification Search
CPC .... G11B 20/10009; G11B 5/09; G11B 5/012; G11B 5/02; G11B 5/782; G11B 27/36; G11B 2220/90; G11B 5/588; G11B 5/59627
USPC .......................... 360/70, 25, 39, 46, 67, 77.06
See application file for complete search history.

(56) References Cited

U.S. PATENT DOCUMENTS

| | | | | |
|---|---|---|---|---|
| 4,414,586 A | * | 11/1983 | Hirota et al. .......... | G11B 5/588 360/70 |
| 4,528,605 A | * | 7/1985 | Hiraguri .............. | G11B 5/5922 360/77.14 |
| 7,177,107 B2 | | 2/2007 | Contreras et al. | |
| 8,913,341 B1 | | 12/2014 | Jury et al. | |
| 8,937,854 B2 | | 1/2015 | Kadlec | |
| 8,953,276 B1 | | 2/2015 | Pokharel et al. | |
| 2011/0222384 A1 | | 9/2011 | Kondo et al. | |
| 2013/0286502 A1 | | 10/2013 | Erden et al. | |
| 2014/0093881 A1 | | 4/2014 | Sugnet et al. | |
| 2014/0358462 A1 | | 12/2014 | Christophersen et al. | |
| 2015/0015990 A1 | | 1/2015 | Chou et al. | |
| 2015/0062730 A1 | | 3/2015 | Mathew | |

FOREIGN PATENT DOCUMENTS

| | | | | |
|---|---|---|---|---|
| JP | 2000-21100 | * | 1/2000 | ....... G11B 20/10009 |

OTHER PUBLICATIONS

Andres, "Application of crosstalk correction factor", http://des-docdb.fnal.gov/0007/000795/001/crosstalk_correction_test.pdf Aug. 2007.
Pullia, "Cross-Talk Limits of Highly Segmented Semiconductor Detectors", IEEE Conf. Rec. Nuclear Sci Symp Dec. 2009.

(Continued)

*Primary Examiner* — Nabil Hindi

(57) ABSTRACT

An apparatus for correcting crosstalk in an array reader magnetic recording system includes an array reader comprising a number of read heads operable to read data from a magnetic storage medium, a preamplifier configured to amplify the signals from the read heads, and a crosstalk correction circuit configured to reduce crosstalk between signals from the read heads.

20 Claims, 4 Drawing Sheets

(56) References Cited

OTHER PUBLICATIONS

Pullia, "TG3 status report", http://www.mpi-hd.mpg.de/gerda/padova09/padova09_slides/090311_tg3_cattadori.pdf Retrieved May 2015.

U.S. Appl. No. 14/614,403, filed Feb. 4, 2015, Scott Dziak, Unpublished.

U.S. Appl. No. 14/259,388, filed Apr. 23, 2014, Travis Oenning, Unpublished.

U.S. Appl. No. 14/158,739, filed Jan. 17, 2014, George Mathew, Unpublished.

U.S. Appl. No. 14/055,886, filed Oct. 17, 2013, Xiufeng Song, Unpublished.

U.S. Appl. No. 14/031,990, filed Sep. 19, 2013, George Mathew, Unpublished.

U.S. Appl. No. 14/021,811, filed Sep. 9, 2013, George Mathew, Unpublished.

Wygant, "Integration of 2D CMUT Arrays with Front-End Electronics for Volumetric Ultrasound Imaging", IEEE Trans Ultrasonics, Ferroelectrics, Freq Ctl, vol. 55, No. 2, Feb. 2008.

* cited by examiner

US 9,401,175 B1

PREAMPLIFIER CROSSTALK CORRECTION IN ARRAY READER MAGNETIC RECORDING SYSTEM

FIELD OF THE INVENTION

Various embodiments of the present invention provide systems and methods for correcting crosstalk in an array reader magnetic recording system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. In an array reader magnetic recording system, the read/write head assembly includes an array of multiple read heads each positioned to read the target track.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

A system, method and apparatus is disclosed herein for correcting crosstalk in an array reader magnetic recording system, also referred to as a two dimensional magnetic recording system. The array reader magnetic recording system uses an array of read heads or magneto-resistive (MR) sensors to retrieve information from one or more data tracks on a storage medium, allowing for increased areal density as well as many system-level and manufacturing benefits. However, the performance of the system can be degraded by crosstalk (coupling) between signals. Dominant sources of crosstalk are from capacitive coupling at the read heads as well as the transmission line between the head and preamplifier, which in some embodiments is a flexible transmission line referred to herein as a flex on suspension, particularly when one or more terminals are shared in the array reader. Due to the effect of crosstalk on performance, it is important to be able to correct crosstalk in the system by filtering to reduce or substantially eliminate the crosstalk. In some embodiments, a crosstalk correction filter is included in the preamplifier which shapes an input signal so that it can be subtracted from the neighboring read paths, thus removing the undesired signal from those paths. In some embodiments, the preamplifier with crosstalk correction filter is implemented as an integrated circuit. The crosstalk can be measured and/or characterized in any suitable manner in order to configure or design the crosstalk correction filter.

Figure 1:
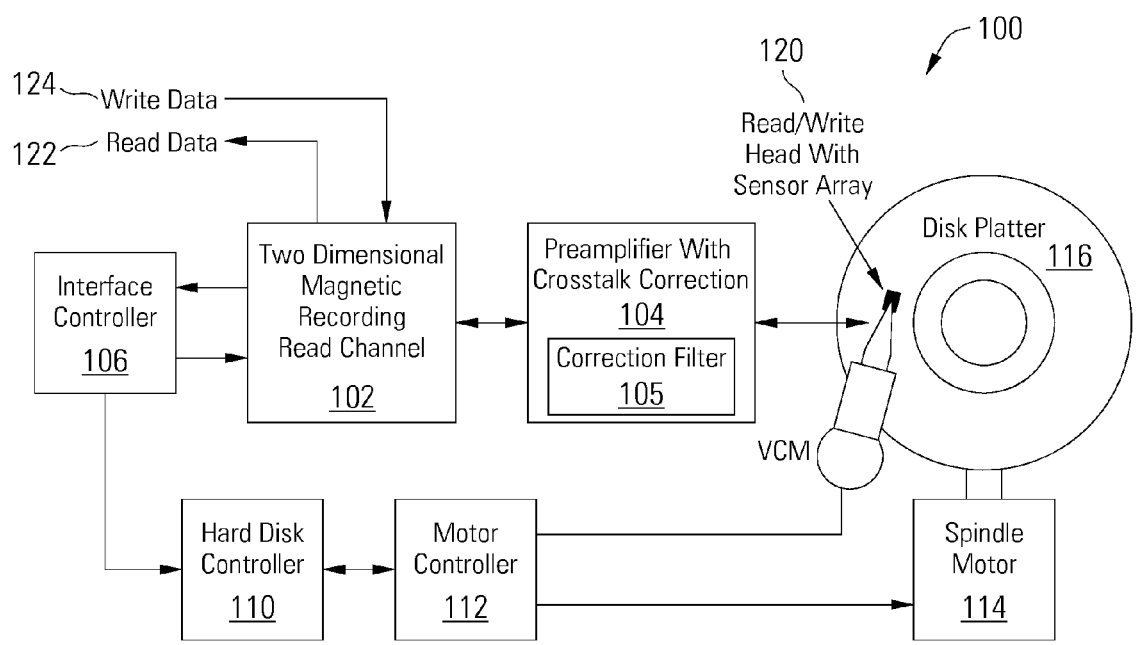
FIG. 1 depicts a storage system including an array reader magnetic recording read channel and preamplifier with crosstalk correction in accordance with some embodiments of the present invention.

Turning to FIG. 1, a storage system 100 is disclosed which includes an array reader magnetic recording system having a preamplifier with crosstalk correction 104 in accordance with some embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. Preamplifier 104 includes a crosstalk correction filter 105 which shapes the signal from each read head or transducer in the read/write head assembly 120. The resulting shaped signals are subtracted from the neighboring read paths from other read heads, thus removing the undesired signal from those paths. Read channel circuit 102 digitizes and decodes the received analog signal to recreate the information originally written to disk platter 116. This data is provided as read data 122 to a receiving circuit. A write operation is substantially the opposite of the preceding read operation with write data 124 being provided to read channel circuit 102. This data is then encoded and written to disk platter 116.

It should be noted that in some embodiments storage system 100 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 100, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 100 is modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory may be used as a cache where it offers faster access time than that offered by disk platter 116. In such a case, the solid state memory may be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

Figure 2:
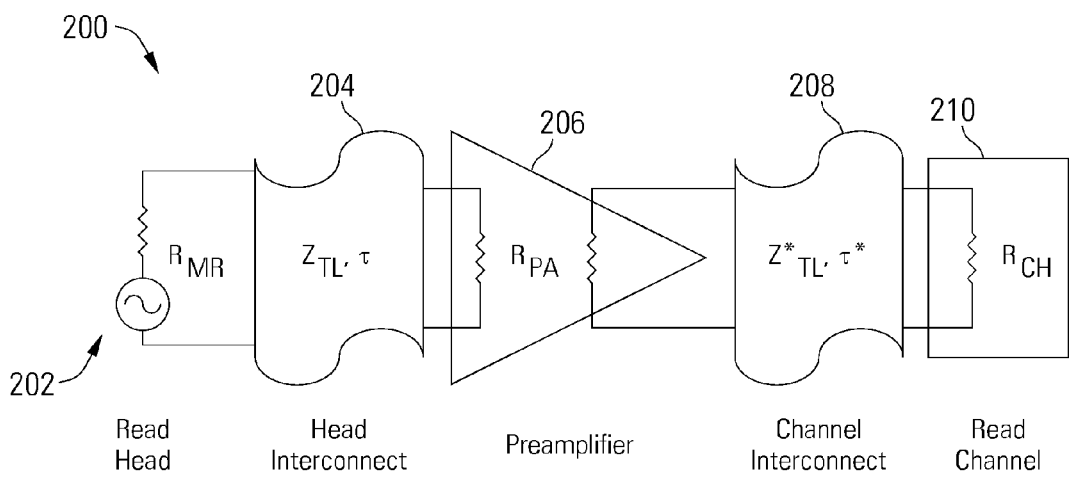
FIG. 2 is a block diagram of an array reader magnetic recording system showing a model with crosstalk of a front-end circuit including read heads, flex on suspension transmission line and preamplifier in accordance with some embodiments of the present invention.

Turning to FIG. 2, a single signal path 200 in an array reader magnetic recording system from the magnetic medium through the read channel 210 is depicted in accordance with some embodiments of the invention. In this system, electrical connectivity between the read transducer 202 and the preamplifier 206 is established by a transmission line or head interconnect 204. Similarly, electrical connectivity between the preamplifier 206 and the read channel 210 is established by a different transmission line or channel interconnect 208. The read transducer 202 is represented by resistance $R_{MA}$ with a bias source. The characteristic impedance and propagation delay of the transmission line 204 between the read transducer 202 and the preamplifier 206 is denoted as $Z_{TL},\tau$. The input impedance of the preamplifier 206 is denoted as $R_{PA}$. The characteristic impedance and propagation delay of the transmission line 208 between the preamplifier 206 and the read channel 210 is denoted as $Z^*_{TL},\tau^*$. The input impedance of the read channel 210 is denoted as $R_{CH}$.

The interface of these components, as well as their inherent frequency response, gives rise to a frequency dependent transfer function, referred to herein as the "through" transfer function, that shapes the actual signal stored on the magnetic media prior to its decoding within the read channel.

Figure 3:
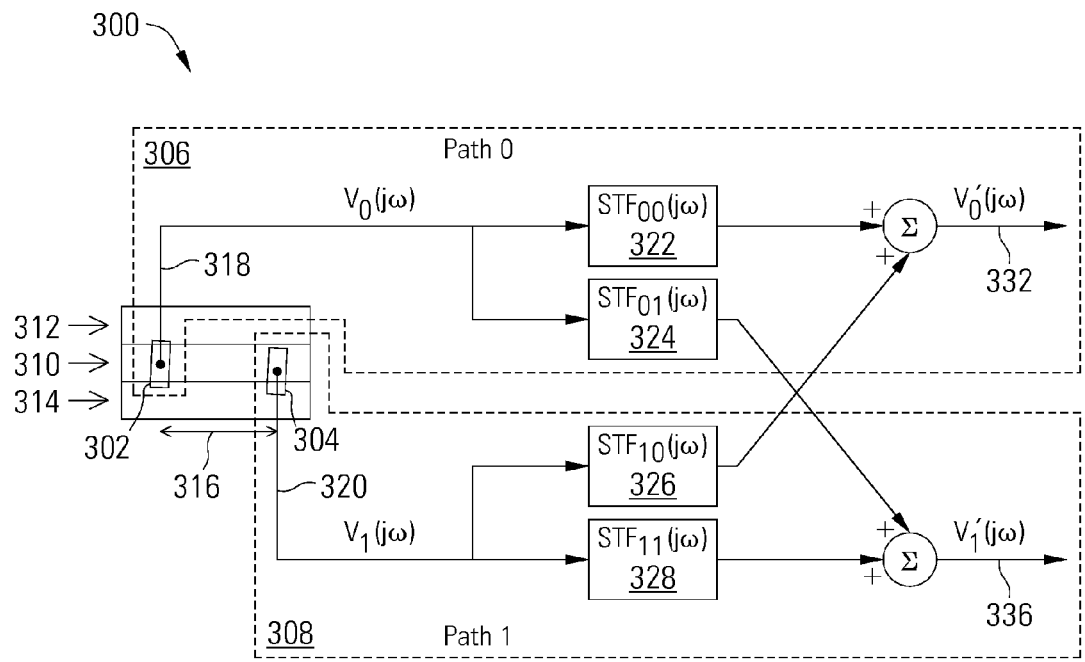
FIG. 3 is a block diagram of an array reader magnetic recording system showing crosstalk in a front-end circuit between a first signal path from a first read head and a second signal path from a second read head in accordance with some embodiments of the present invention.

Turning to FIG. 3, an array reader magnetic recording system 300 showing crosstalk in a front-end circuit between a first signal path 306 from a first read transducer 302 and a second signal path 308 from a second read transducer 304 is depicted in accordance with some embodiments of the present invention. Although the example system 300 includes two read transducers 302, 304, the crosstalk correction disclosed herein can be used with any number of read transducers and signal paths. The read transducers 302, 304 are positioned over a target track 310 between side tracks 2312, 314. In some embodiments, there is a down track separation 316 between the read transducers 302, 304, causing an offset between the signals $V_0(j\omega)$ 318 and $V_1(j\omega)$ 320 from the read transducers 302, 304 which can be corrected in any suitable manner such as a variable delay circuit (not shown), aligning signals 318, 320.

The through transfer functions 322, 328 for signal paths 306, 308 are denoted as $STF_{00}(j\omega)$ and $STF_{11}(j\omega)$, respectively. Ideally, the signals at Viterbi or other maximum likelihood detectors in the downstream read channel would contain nothing in addition to the signals yielded by these through transfer functions 322, 328. However, each signal path 306, 308 will include at least a second component due to crosstalk between the two paths. The cross transfer function 324 from signal $V_0(j\omega)$ 318 in path 0 306 to path 1 308 is defined as $STF_{01}(j\omega)$, and the cross transfer function 326 from $V_1(j\omega)$ 320 in path 1 308 to path 0 306 is defined as $STF_{10}(j\omega)$. Accounting for or including the cross path terms yields the signals $V'_0(j\omega)$ 332 and $V'_1(j\omega)$ 336.

Crosstalk is caused by many factors. Some examples include:

1) Coupling between read transducers.
2) Coupling between signal traces on the interconnect between the read transducers and the preamplifier.
3) Finite impedance to AC ground on the input terminals of the preamplifier in shared pin systems.
4) Coupling between signals within the preamplifier.

The preamplifier with crosstalk correction filter disclosed herein reduces the amount of crosstalk contained within the output signals of the preamplifier so that the read channel has a "clean" version of the signals to use for additional processing and ultimately, bit detection.

Figure 4:
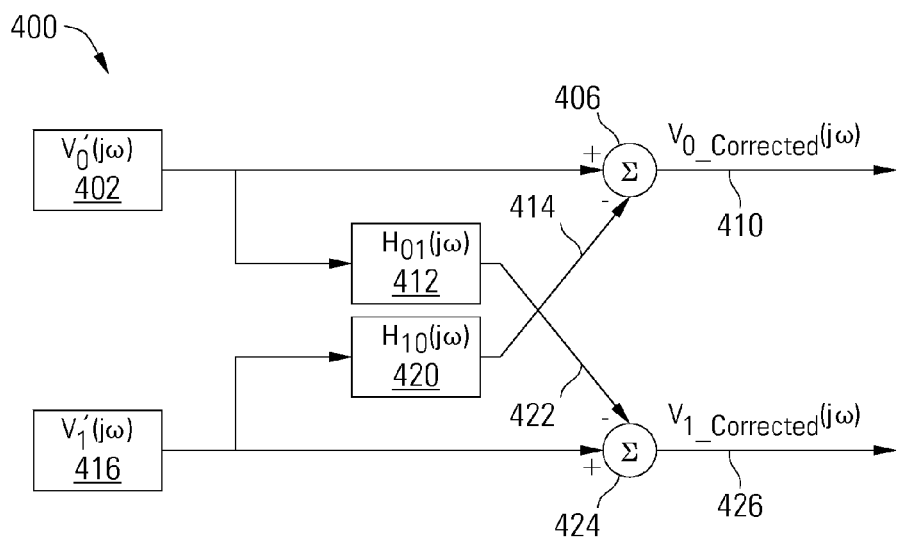
FIG. 4 is a block diagram of a crosstalk correction filter in a two-path preamplifier of an array reader magnetic recording system in accordance with some embodiments of the present invention.

Turning to FIG. 4, a crosstalk correction filter 400 in a two-path preamplifier of an array reader magnetic recording system is depicted in accordance with some embodiments of the present invention. Input signals $V'_0(j\omega)$ 402 and $V'_1(j\omega)$ 416 in some embodiments are preamplifier input signals from read transducers in the array reader. In some embodiments, signals $V'_0(j\omega)$ 402 and $V'_1(j\omega)$ 416 have been processed upstream in the preamplifier, for example by amplifying, filtering, or in any other manner. By definition, path 0 contains the information which gives rise to the crosstalk present in path 1 and vice versa. Thus, the portion of signal $V'_0(j\omega)$ 402 occurring in path 1 can be greatly reduced or effectively removed altogether if one shapes signal $V'_0(j\omega)$ 402 and subtracts it from $V'_1(j\omega)$ 416, yielding $V_{1\_Corrected}(j\omega)$ 426, the crosstalk-corrected output of path 1. $V_{0\_Corrected}(j\omega)$ 410, the crosstalk-corrected output of path 0, is generated in an analogous manner by shaping signal $V'_1(j\omega)$ 416 and subtracting it from $V'_0(j\omega)$ 402. Crosstalk correction transfer functions $H_{01}(j\omega)$ 412 and $H_{10}(j\omega)$ 420 which perform the desired shaping functions can be implemented with one or more filters. Their function in reproducing cross transfer function $STF_{01}(j\omega)$ 324 and cross transfer function $STF_{10}(j\omega)$ 326 may or may not be identical. The filter implementing crosstalk correction transfer function $H_{01}(j\omega)$ 412 generates a shaped signal 422 based on signal $V'_0(j\omega)$ 402, which is subtracted from signal $V'_1(j\omega)$ 416 in subtraction circuit 424, yielding crosstalk-corrected signal $V_{1\_Corrected}(j\omega)$ 426. The filter implementing crosstalk correction transfer function $H_{10}(j\omega)$ 420 generates a shaped signal 414 based on signal $V'_1(j\omega)$ 416, which is subtracted from signal $V'_0(j\omega)$ 402 in subtraction circuit 406, yielding crosstalk-corrected signal $V_{0\_Corrected}(j\omega)$ 410. A filter can be included to generate each crosstalk-corrected signal to be subtracted from the output of each read transducer. For example, in some embodiments of a three-transducer array reader, a filter bank with six filters is included implementing six crosstalk correction transfer functions, with the shaped signals from transducers 1 and 2 being subtracted from the signal from transducer 0, with shaped signals from transducers 0 and 2 being subtracted from the signal from transducer 1, and with shaped signals from transducers 0 and 1 being subtracted from the signal from transducer 2. In some embodiments, where crosstalk is negligible between some of the transducers, crosstalk correction between those transducers can be omitted.

The crosstalk correction filters can be implemented in any suitable manner, such as, but not limited to, in a continuous time analog filter with configurable lower and upper corner frequencies and gain using any suitable architecture. Based upon the disclosure provided herein, one of ordinary skill in the art will recognize a variety of analog filter circuits that can be included in the preamplifier for crosstalk correction in relation to different embodiments of the present invention. In some embodiments, crosstalk correction can be performed in the read channel (e.g., 102) by one or more digital filters such as, but not limited to, digital finite impulse response (DFIR) filters, either combined with or in place of crosstalk correction in the preamplifier.

The crosstalk can be measured or characterized in any suitable manner in order to configure the crosstalk correction transfer functions $H_{01}(j\omega)$ 412 and $H_{10}(j\omega)$ 420 such that they will reduce or cancel the crosstalk. For example, read transducers can be selectively driven, enabling one while the others in the array are disabled, or by biasing one of the transducers while the others are de-biased, effectively turning off transducers so that any signal on the read-back lines associated with the de-biased sensors is due only to crosstalk (and noise). In that configuration, the array reader is passed over a pseudo-random bit sequence on the storage medium while measuring the crosstalk. In some other embodiments, a signal can be induced in one of the read heads using, for example, the write lines in the read/write head assembly. In these embodiments, the array reader is positioned to avoid receiving a signal from the storage medium, for example by positioning the array reader over an erased area of the storage medium, or by positioning the array reader on the load/unload ramp, such that the array reader does not receive transitioning data from the storage medium. The write lines corresponding to one of the read transducers are driven with a pseudo-random bit sequence, while the crosstalk is measured. By using a pseudo-random bit sequence to drive read heads during the crosstalk measurement and characterization, the effect of noise on the results is negligible in some embodiments.

The transfer functions of the crosstalk can be measured in several different ways. The relative signal power of the signal line from the driven read head compared to the signal power from the other read heads can be measured, resulting in an estimate of the relative power or energy in the crosstalk. The shape of the transfer function can also be characterized, giving the frequency response of the crosstalk. For example, to measure or calculate a crosstalk transfer function (e.g, $STF_{01}(j\omega)$ 324) from a first signal path 306 to a second signal path 308 in an analog crosstalk correction embodiment, impedance values can be swept while measuring characteristics of the output signals, or the crosstalk transfer function can be calculated based on the design of the preamplifier and the models of the recording head and the interconnect between the recording head and preamplifier. To measure a crosstalk transfer function (e.g, $STF_{01}(j\omega)$ 324) from a first signal path 306 to a second signal path 308 in a digital crosstalk correction embodiment, an array of read heads is configured to drive a first one of the heads 302 with a pseudo-random bit sequence. The received input on the signal path 306 from the first read head 302 is convolved with a time-reversed or mirrored version of the pseudo-random bit sequence to yield a first transfer function. The received input on the signal path 308 from the second read head 304 is convolved with a time-reversed or mirrored version of the pseudo-random bit sequence to yield a second transfer function. The inverse of the first transfer function is computed and is convolved with the second transfer function to yield a measure of the crosstalk transfer function 324 from the first signal path 306 to the second signal path 308.

Figure 5:
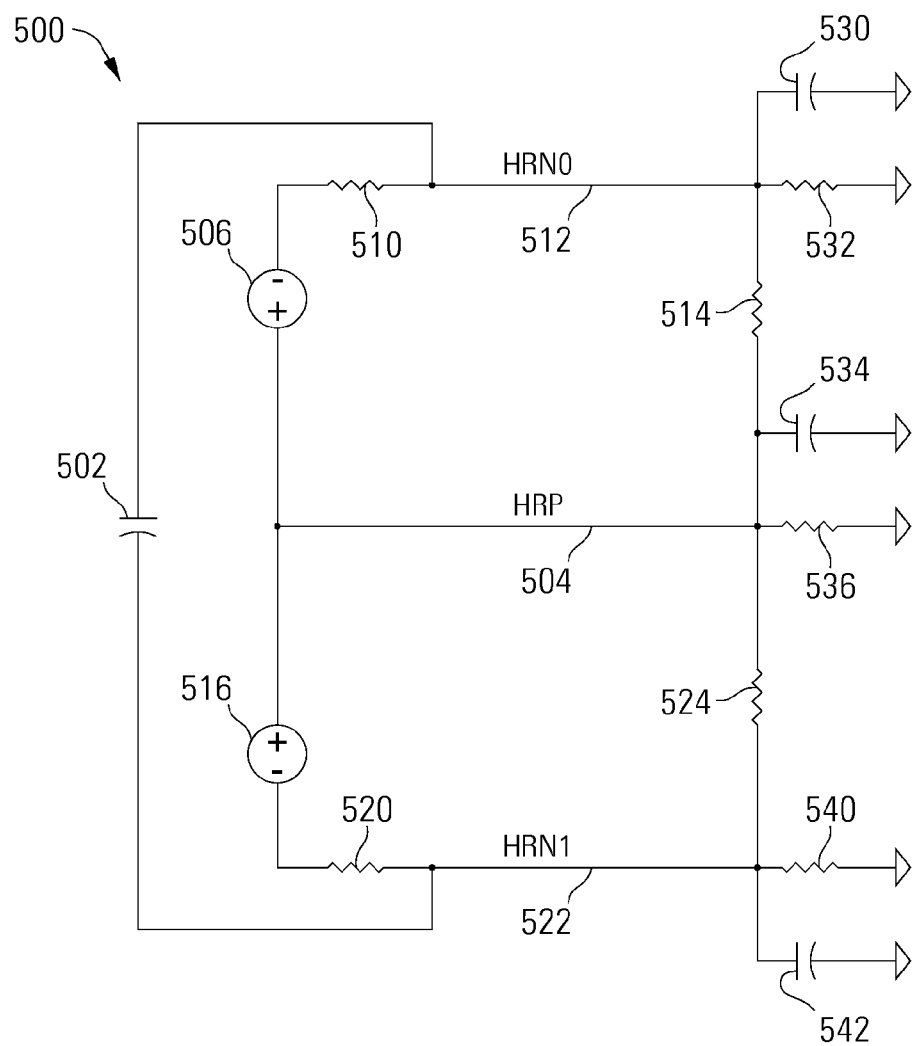
FIG. 5 is a schematic diagram showing preamplifier input impedance and head coupling capacitance in accordance with some embodiments of the present invention.

Turning to FIG. 5, a schematic diagram 500 models the input network of a two read path, shared pin array reader magnetic recording system, which depicts preamplifier input impedance and head coupling capacitance in accordance with some embodiments of the present invention. Again, the crosstalk correction disclosed herein is not limited to use with any particular number of transducers in the array reader, or to use with an array reader with a common terminal that is shared by multiple transducers as in the model of diagram 500. Based upon the disclosure provided herein, one of ordinary skill in the art will recognize a variety of array reader configurations and topologies for which crosstalk can be corrected as disclosed herein.

For the sake of simplicity in FIG. 5, the transmission line between the read transducers and the preamplifier has been omitted. The head to head crosstalk between the two transducers at the dedicated or non-shared terminals (both internal and external to the preamplifier) is modeled by $C_{H2H}$ 502. The shared terminal HRP 504 is the terminal shared by the two paths whereas terminal HRN0 512 and terminal HRN1 522 are the independent terminals for paths 0 and 1, respectively. The diagram 500 also contains a simplified model of the preamplifier input impedance, with $R_{PA}$ 514 representing the differential resistance the preamplifier presents between the shared terminal HRP 504 and the dedicated terminal HRN0 512 of path 0, and with $R_{PA}$ 524 representing the differential resistance the preamplifier presents between the shared terminal HRP 504 and the dedicated terminal HRN1 522 of path 1. The single-ended resistance and capacitance that the preamplifier presents at the shared terminal HRP 504 is modeled by $R_S$ 536 and $C_S$ 534, respectively. The single-ended resistance and capacitance that the preamplifier presents at dedicated terminal HRN0 512 in path 0 is modeled by $R_S$ 532 and $C_S$ 530, respectively. The single-ended resistance and capacitance that the preamplifier presents at dedicated terminal HRN1 522 in path 1 is modeled by $R_S$ 540 and $C_S$ 542, respectively. The resistance of the transducer in path 0 is modeled by $R_{MR}$ 510, driven by voltage supply 506. The resistance of the transducer in path 1 is modeled by $R_{MR}$ 520, driven by voltage supply 516.

For the purpose of the following analysis, the crosstalk from path 0 to 1 is defined as:

$$XT_{01}(j\omega) = \frac{STF_{01}(j\omega)}{STF_{11}(j\omega)} \quad (Eq\ 1)$$

As one would anticipate, a similar definition can be used for the crosstalk from path 1 to 0 or any arbitrary number of heads.

Because the magnitude of $XT_{01}$ will vary as a function of frequency, to more easily quantify its magnitude over a range of frequencies the integrated crosstalk measurement is defined as:

$$Int_{XT_{01}} = 10\log_{10}\left[\frac{\int_{f_{min}}^{f_{max}} |XT_{01}(j\omega)|^2 df}{f_{max} - f_{min}}\right] \quad (Eq\ 2)$$

In the results which follow, unless stated otherwise $f_{min}=1$ MHz and $f_{max}=2.5$ GHz. Furthermore, it is assumed that a signal is present on path 0 only (i.e. AC magnitude of supply 506 is 1V/V at all frequencies and 0V/V for supply 516).

The dependency of crosstalk on single-ended resistance (e.g., $R_S$ 532) can be examined, for example, by assuming that $C_{H2H}$ 502 is 0 fF while sweeping the single-ended resistance (e.g., $R_S$ 532), for example from 10 ohms to 10$k$ ohms with $R_{MR}$ 510=500 ohms and $R_{PA}$ 514=75 ohms. (These values are merely examples that can be used in one case to examine the dependency of crosstalk on the single-ended resistance.) The results show that crosstalk is inversely proportional to the single-ended resistance $R_S$. If plotted, the crosstalk $XT_{01}(j\omega)$ will be a series of flat lines (i.e., not frequency dependent) when only the single-ended resistance $R_S$ is swept through different values, with higher values of single-ended resistance $R_S$ resulting in lower magnitudes of crosstalk $XT_{01}(j\omega)$. If the single-ended resistance $R_S$ can be made to be sufficiently large with respect to the other crosstalk contributors then compensation for it is not performed in some embodiments. If this cannot be done in the system design then the finite value of the single-ended resistance $R_S$ is accounted for in the crosstalk correction circuitry. It can be shown that the desired transfer function to accomplish this is:

$$H_{01}(j\omega) = \frac{Vin_1(j\omega)}{Vin_0(j\omega)} = \frac{R_{PA}R_{MR}}{3R_S\cdot(R_{PA}+R_{MR})+2R_{PA}R_{MR}} \quad (Eq\ 3)$$

Where $Vin_0(j\omega)=HRP(j\omega)-HRN0(j\omega)$ and $Vin_1(j\omega)=HRP(j\omega)-HRN1(j\omega)$.

Next to consider is the problem of single-ended capacitance (e.g., $C_S$ 530). Sweeping the single-ended capacitance (e.g., $C_S$ 530), for example from 0 fF to 2 pF, with a fixed single-ended resistance $R_S$ (e.g., 1 k ohm), yields a series of frequency dependent curves for crosstalk $XT_{01}(j\omega)$ which all converge at common crosstalk magnitudes at low and high frequencies but having low corner frequencies which are directly proportional to single-ended capacitance $C_S$. A higher single-ended capacitance $C_S$ yields a higher low corner frequency. Calculating the integrated crosstalk measurement $Int_{XT_{01}}$ as a function of single-ended capacitance $C_S$ yields the following table:

| | |
|---|---|
| 0 | −38.92 |
| 100 fF | −35.7 |
| 250 fF | −29.43 |
| 500 fF | −23.67 |
| 750 fF | −20.34 |
| 1 pF | −18.09 |
| 1.25 pF | −16.45 |
| 1.5 pF | −15.19 |
| 1.75 pF | −14.2 |
| 2 pF | −13.4 |

If it is desired that $Int_{XT_{01}}$ always be less than −30 dB it can be seen that only for the smallest values of $C_S$ (250 W or less) crosstalk correction would not be required. Achieving such low values of pin capacitance may not be feasible in most applications.

To begin addressing this problem the desired transfer function of the correction circuit (e.g., $H_{01}(j\omega)$) is calculated. Letting $R_S=\infty$ to focus only on the effect of $C_S$ it can be seen that:

$$H_{01}(j\omega) = \frac{Vin_1(j\omega)}{Vin_0(j\omega)} = \frac{0.5j\omega}{j\omega + 1/2\tau} \quad (Eq\ 4)$$

where $$\tau = \frac{C_S R_{PA} R_{MR}}{3(R_{PA}+R_{MR})} \quad (Eq\ 5)$$

By sweeping $C_S$ with $R_S=\infty$, with fixed $R_{MR}$ 510 (e.g., 500 ohms) and $R_{PA}$ 514 (e.g., 75 ohms), it can be seen that all crosstalk $XT_{01}(j\omega)$ curves converge upon the value of −6 dB as $f\to\infty$. This is because the input of path 0 sees the full voltage from source 506 at frequencies where the dedicated terminals are essentially AC grounds whereas path 1 only sees one-half of the voltage. The high pass nature of the transfer function can also be seen with the corner frequency being inversely proportional to $C_S$. Making use of these observations provides the target for the implementation of $H_{01}(j\omega)$.

Again, in some embodiments the value of the single-ended resistance $R_S$ is sufficiently large with respect to the other crosstalk contributors that its effect on crosstalk is negligible and $H_{01}(s)$ does not account for the effect of the single-ended resistance $R_S$. The effect of the single-ended resistance $R_S$ in comparison to the effect of the single-ended capacitance $C_S$ on crosstalk can be simulated for a design by plotting crosstalk $XT_{01}(j\omega)$ curves for various values of $R_S$ and $C_S$, both prior to and after correction circuitry, to determine whether including $R_S$ alters the high pass corner frequency of $XT_{01}(j\omega)$.

Including coupling capacitance between the dedicated terminals (i.e. $C_{H2H}$ 502) generally increases crosstalk. To correct for this inclusion in the model of coupling capacitance between the dedicated terminals, the crosstalk correction filter corner can be lowered and the filter gain raised. In one particular example, lowering the crosstalk correction filter corner from about 2.5 GHz to 2 GHz and raising the filter gain from −6 dB to approximately −5 dB yields the desired correcting transfer function, thereby compensating for the coupling capacitance between the dedicated terminals in the array reader.

In some embodiments of a preamplifier, the differential resistance $R_{PA}$ (e.g., 514) presented by the preamplifier is programmable by the user via control register bits in the preamplifier, automatically programming the crosstalk correction filter corner as a function of $R_{PA}$. The gain required in the crosstalk correction filter is established in some embodiments by the single-ended capacitance $C_S$ and not by the differential resistance $R_{PA}$. By sweeping the values of differential resistance $R_{PA}$ 514 in path 0 in simulations it can be seen that the crosstalk from path 0 to 1 $XT_{01}(j\omega)$ is substantially independent of the differential resistance $R_{PA}$ 524 presented by the preamplifier between the shared terminal HRP 504 and the dedicated terminal HRN1 522 of path 1.

However, the crosstalk from path 0 to 1 $XT_{01}(j\omega)$ is dependent upon the $R_{MR}$ 520 of the transducer in path 1 (see Equation 5). It can be seen that when the crosstalk correction path is tuned for an $R_{MR}$ of a particular value, $Int_{XT_{01}}$ degrades as $R_{MR}$ 520 is either decreased or increased from that value. The degree of degradation is a function of the differential resistance $R_{PA}$ 524 as the parallel combination of $R_{PA}$ 524 and $R_{MR}$ 520 defines the desired corner frequency. Not compensating the corner frequency for $R_{MR}$ variation still allows for a substantial minimum improvement. If more improvement is required then other options can be used to account for variation in $R_{MR}$ 520, including, for example, user interaction and automatically sensing the value of $R_{MR}$ 520 in the preamplifier and adjusting the corner frequency accordingly.

The above examples assume a differential input impedance $R_{PA}$ for the preamplifier that is flat across frequency. However, device limitations and other factors can result in impedance peaking or attenuation within the frequency band of interest. However, the techniques disclosed herein for $H_{01}(j\omega)$ can be utilized and modified only slightly based on the system design to achieve significant improvement.

The transmission line which establishes the electrical connectivity between the read head and the preamplifier can also be accounted for in the crosstalk correction. When this is done, the impedance in parallel with $R_{PA}$ is no longer simply $R_{MR}$ across all frequencies, but rather:

$$Z_{EQ}(j\omega) = Z_0 \frac{R_{MR}\cos\omega t_{pd} + jZ_0\sin\omega t_{pd}}{Z_0\cos\omega t_{pd} + jR_{MR}\sin\omega t_{pd}} \quad (Eq\ 6)$$

where $Z_0$ and $t_{pd}$ are the characteristic impedance and propagation time of the transmission line, respectively. The magnitude of $Z_{EQ}(j\omega)$ will vary between extremes of $R_{MR}$ and $Z_0^2/R_{MR}$ at the even and odd resonant frequencies of the interconnect. The resonant frequencies are defined by the length of the line and can be calculated as:

$$f_{Resonant} = \frac{n}{4t_{pd}} \quad (Eq\ 7)$$

where n takes on integer values including zero. Equations (6) and (7) can be used to modify the corner frequency appropriately or to design a more sophisticated, higher order filter, taking into consideration the specific requirements of a given system (e.g. recording density, data rate, read head frequency response, etc.). If greater crosstalk reduction is desired then one could incorporate the frequency dependent impedance characteristic introduced by the interconnect (6) into the filter. A real interconnect that has lossy terms as well as crosstalk terms may also affect the optimal implementation and tuning of the correcting filter. In summary, by filtering the signal on one path and subtracting it from the other(s), crosstalk can be significantly reduced over a wide range of system variables.

Figure 6:
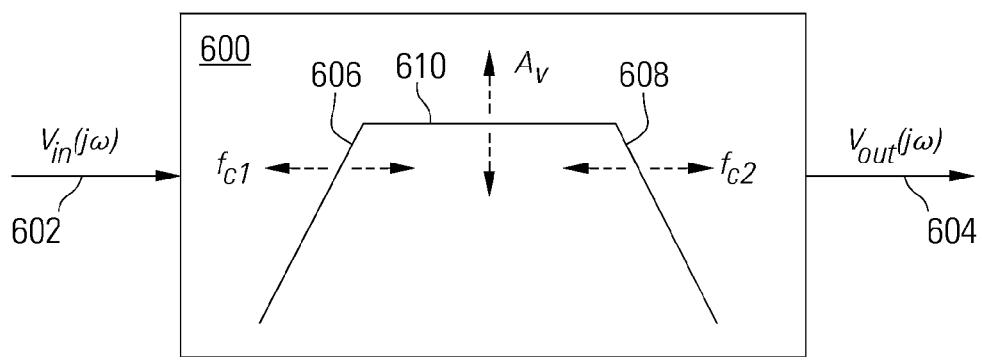
FIG. 6 depicts a transfer function of a crosstalk correction filter in the preamplifier of an array reader magnetic recording system in accordance with some embodiments of the present invention.

Turning to FIG. 6, the transfer function of a crosstalk correction filter 600 in the preamplifier of an array reader magnetic recording system is depicted in accordance with some embodiments of the present invention. The crosstalk correction filter 600 shapes the input $V_{in}(j\omega)$ 602, yielding an output $V_{out}(j\omega)$ 604 that represents crosstalk from a transducer that can be subtracted from signals in neighboring paths from other transducers to cancel or reduce the effects of the crosstalk on the neighboring paths. The transfer function $H(j\omega)$ implemented by the crosstalk correction filter 600 is controlled or designed to adjust the corner frequencies 606, 608 and the gain 610 of the filter based on the crosstalk in the system.

Figure 7:
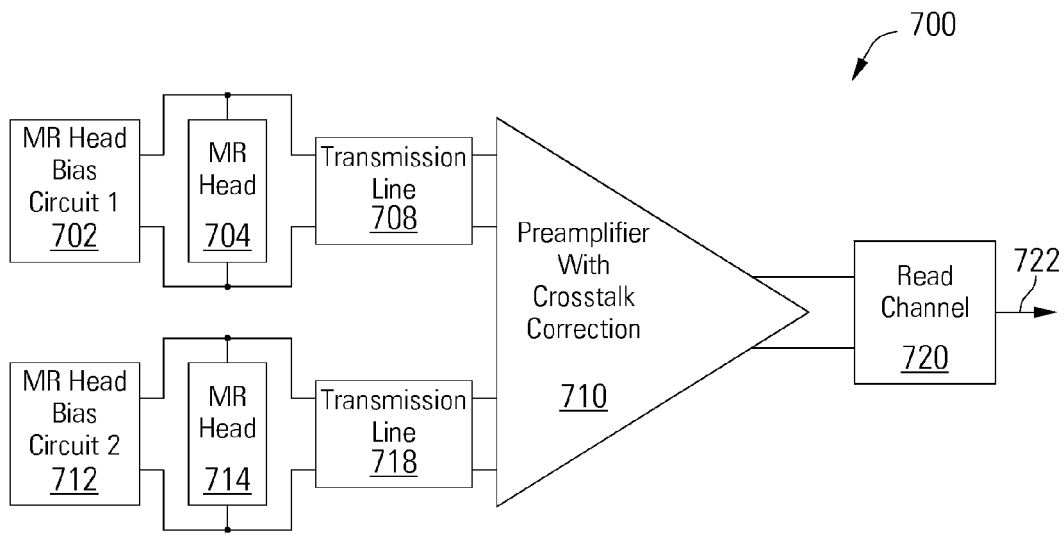
FIG. 7 depicts a block diagram of a front end in an array reader magnetic recording system including a preamplifier with crosstalk correction filter in accordance with some embodiments of the present invention.

Turning to FIG. 7, a block diagram of a front end in an array reader magnetic recording system including a preamplifier with crosstalk correction filter is depicted in accordance with some embodiments of the present invention. As mentioned above, the crosstalk correction disclosed herein can be applied to array readers with shared terminals or with dedicated terminals only, as shown in FIG. 7, and can be applied to array readers with any number of transducers, such as, but not limited to, two transducers 704, 714 as shown in FIG. 7. One or more head biasing circuits 702, 712 can be used to drive the transducers 704, 714 as they are passed over the storage medium during a read operation, and the resulting signals are transmitted to the preamplifier with crosstalk correction 710 over flexible transmission lines 708, 718. A crosstalk correction filter in the preamplifier corrects or reduces crosstalk in the signals by determining the crosstalk resulting from each signal on other signals and subtracting the crosstalk from the other signals. Again, the transfer function of the crosstalk between each signal path can be determined in any suitable manner, and filters in the preamplifier 710 shape the signals from the transducers 704, 714 to yield representations of the crosstalk which can be subtracted from signals in other signal paths. The resulting corrected signals can be processed in any suitable manner, for example in a read channel 720 to yield the originally stored data 722. In other embodiments, crosstalk correction can be performed in the digital domain in the read channel 720.

Figure 8:
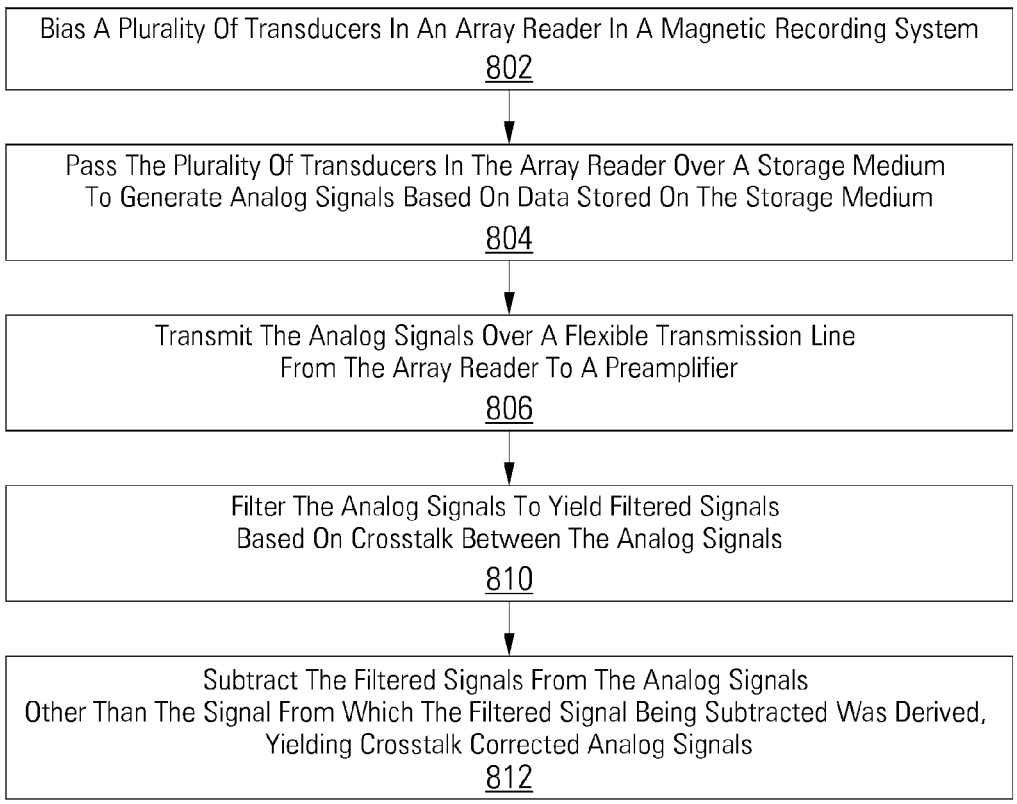
FIG. 8 is a flow diagram showing a method for correcting crosstalk in a preamplifier in an array reader magnetic recording system in accordance with some embodiments of the present invention.

Turning to FIG. 8, a flow diagram 800 shows a method for correcting crosstalk in an array reader magnetic recording system in accordance with some embodiments of the present invention. Following flow diagram 800, a number of transducers in an array reader in a magnetic recording system are biased. (Block 802) In some embodiments, the transducers have at least one shared terminal, for example sharing a common lead. In other embodiments, the transducers do not share a terminal or lead. The array reader can include any number of transducers, and can be configured to read a single data track at a time or multiple data tracks on a magnetic storage medium. The transducers in the array reader are passed over a magnetic storage medium to generate analog signals based on data stored on the storage medium. (Block 804) The analog signals are transmitted over a flexible transmission line from the array reader to a preamplifier. (Block 806)

The analog signals are filtered to yield filtered signals based on crosstalk between the analog signals. (Block 810) The filter shapes the analog signals being filtered to represent crosstalk from one or more sources, such as at the transducer, at the interconnect and at the input to the preamplifier.

The filtered signals are subtracted from the analog signals other than the signal from which the filtered signal being subtracted was derived, yielding crosstalk corrected analog signals. (Block 812) For example, in a three transducer embodiment, a filtered signal generated based on transducer 0 is subtracted from analog signals from transducer 1 and from transducer 2, a filtered signal generated based on transducer 1 is subtracted from analog signals from transducer 0 and from transducer 2, and a filtered signal generated based on transducer 2 is subtracted from analog signals from transducer 0 and from transducer 1. The corrected signal for path 0 from transducer 0 thus contains the analog signal from transducer 0, minus filtered or shaped versions of the analog signals from transducer 1 and from transducer 2 to compensate for crosstalk from paths 1 and 2 to path 0.

The crosstalk corrected analog signals can then be processed in any suitable manner, for example by sampling them in analog to digital converters, equalizing the resulting digital data, and selecting one of the digital data streams or combining the multiple digital data streams to yield a single digital data stream. Values of data bits or symbols represented by the digital data stream can be detected using a Viterbi detector or other maximum likelihood detector, and error correction decoding can be performed, for example using a low density parity check decoder or other decoder, to generate the data that was stored on the magnetic storage medium.

In some embodiments, crosstalk correction is performed in the digital domain, for example using a digital finite impulse response filter (DFIR) in the read channel (e.g., 102). In some such embodiments, an amplified signal from the preamplifier in which crosstalk has not been corrected is provided to an analog front end circuit for filtering, amplification or other processing, then to an analog to digital converter circuit to generate digital samples. The digital samples can then be equalized, values of data bits or symbols represented by the digital samples can be detected using a Viterbi detector or other maximum likelihood detector, and error correction decoding can be performed, for example using a low density parity check decoder or other decoder. Crosstalk correction can be performed in the digital domain downstream from the analog to digital converter, for example using a DFIR between the analog to digital converter and the equalizer or between the equalizer and data detector.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

In conclusion, the present invention provides novel crosstalk cancellation in an array reader magnetic recording system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus comprising:
an array reader comprising a plurality of read heads operable to read data from a magnetic storage medium;
a preamplifier configured to amplify the signals from the plurality of read heads; and
a crosstalk correction circuit configured to reduce crosstalk between signals from the plurality of read heads.

2. The apparatus of claim 1, wherein the crosstalk correction circuit is embodied in the preamplifier.

3. The apparatus of claim 2, further comprising a shared-lead transmission line connecting the array reader and the preamplifier.

4. The apparatus of claim 3, wherein the crosstalk correction circuit is configured to reduce crosstalk due at least in part to coupling between the plurality of read heads and coupling between traces in the shared-lead transmission line.

5. The apparatus of claim 1, wherein the crosstalk correction circuit comprises a filter configured to shape one of the signals from one of the plurality of read heads and a subtraction circuit configured to subtract an output of the filter from another of the signals from another of the plurality of read heads.

6. The apparatus of claim 1, wherein the crosstalk correction circuit comprises an analog circuit configured to reduce crosstalk in an analog signal.

7. The apparatus of claim 1, wherein the crosstalk correction circuit comprises a digital circuit configured to reduce crosstalk in a digital signal derived from the signals from the plurality of read heads, downstream from the preamplifier.

8. The apparatus of claim 1, wherein the plurality of read heads are configured to read from a single data track.

9. The apparatus of claim 1, wherein the plurality of read heads are configured to read from multiple data tracks simultaneously.

10. A method of reducing crosstalk in a storage system with multiple read heads, comprising:
reading from a storage medium with an array of read heads to yield a plurality of signals;
filtering the signals to yield filtered signals based on crosstalk between the signals; and
subtracting the filtered signals from the signals other than the signal from which the filtered signal being subtracted was derived.

11. The method of claim 10, wherein the filtering and the subtracting reduces effects of crosstalk between the signals.

12. The method of claim 10, further comprising amplifying the signals in a preamplifier circuit, wherein the filtering and the subtracting is performed in the preamplifier circuit.

13. The method of claim 12, further comprising transmitting the signals from the read heads to the preamplifier circuit by a shared-lead flexible circuit.

14. The method of claim 12, wherein the filtering and the subtracting is performed on analog signals.

15. The method of claim 10, wherein the filtering of a first one of the signals yields one of the filtered signals to be subtracted from a second one of the signals based on a transfer function of crosstalk from said first one of the signals to said second one of the signals.

16. The method of claim 10, further comprising digitizing the signals to yield digital signals, wherein the filtering and the subtracting is performed on the digital signals.

17. A storage device, comprising:
a magnetic storage medium operable to store data;
a head assembly disposed in relation to the storage medium and comprising an array reader with a plurality of read heads to read and write the data on the storage medium;
at least one preamplifier connected to the plurality of read heads; and
means for correcting crosstalk between the plurality of read heads.

18. The storage device of claim 17, wherein the means for correcting crosstalk comprises continuous time analog filter means in the at least one preamplifier.

19. The storage device of claim 18, wherein the means for correcting crosstalk comprises means for subtracting filtered signals from the filter means from signals from the plurality of read heads.

20. The storage device of claim 17, further comprising a read channel connected to the at least one preamplifier, wherein the means for correcting crosstalk comprises digital filter means in the read channel.

\* \* \* \* \*